United States Patent
Agin et al.

(10) Patent No.: US 7,545,731 B2
(45) Date of Patent: Jun. 9, 2009

(54) VIRTUAL BUFFER SIZE MANAGEMENT SYSTEM FOR THE TRANSMISSION OF BLOCKS OF DATA BITS IN AN HS-DSCH DOWNLINK CHANNEL OF A MOBILE COMMUNICATIONS NETWORK

(75) Inventors: Pascal Agin, Chatillon (FR); Rémi Stefanini, Paris (FR)

(73) Assignee: Evolium S.A.S., Paris (FR)

( * ) Notice: Subject to any disclaimer, the term of this patent is extended or adjusted under 35 U.S.C. 154(b) by 630 days.

(21) Appl. No.: 11/092,728

(22) Filed: Mar. 30, 2005

(65) Prior Publication Data
US 2005/0220024 A1 Oct. 6, 2005

(30) Foreign Application Priority Data
Mar. 31, 2004 (FR) .................................. 04 50629

(51) Int. Cl.
*H04J 9/00* (2006.01)
*H04L 5/04* (2006.01)
*H04J 11/00* (2006.01)
*H04L 5/12* (2006.01)
*H04L 23/02* (2006.01)

(52) U.S. Cl. .................. 370/204; 370/206; 370/215; 370/329; 375/261

(58) Field of Classification Search ................. 370/235, 370/412, 329, 208
See application file for complete search history.

(56) References Cited
U.S. PATENT DOCUMENTS 6,624,767 B1 * 9/2003 Shiu et al. .................... 341/81
6,697,986 B2 * 2/2004 Kim et al. .................... 714/751
7,391,727 B2 * 6/2008 Yoon et al. ................... 370/232
2003/0081576 A1 * 5/2003 Kim et al. .................... 370/335
2003/0081690 A1 * 5/2003 Kim et al. .................... 375/264
2003/0097629 A1 * 5/2003 Moon et al. .................. 714/751
2003/0123409 A1   7/2003 Kim
2003/0133497 A1 * 7/2003 Kinjo et al. ................... 375/152
2005/0100085 A1 * 5/2005 Dottling et al. .............. 375/240
2008/0046800 A1 * 2/2008 Pietraski et al. ............. 714/790

FOREIGN PATENT DOCUMENTS
EP 1 389 848 A 2/2004

* cited by examiner

*Primary Examiner*—Chi H Pham
*Assistant Examiner*—Farah Faroul
(74) *Attorney, Agent, or Firm*—Sughrue Mion, PLLC

(57) ABSTRACT

A first rate matching stage matches a number of input bits coming from a transport channel including a high-speed downlink shared channel (HS-DSCH) of a block of data bits to be transmitted from a base station of a communications network to one or more pieces of user equipment (UE) to a selected number of intermediate bits as determined by the buffer size management system. A virtual buffer stores the selected number of intermediate bits. A second rate matching stage matches the selected number of intermediate bits to a number of output bits equal to a maximum number of bits that is guaranteed to be transmitted by a set of high-speed physical downlink shared channels (HS-PDSCH) associated with the transport channel in a given time interval without adding bits.

13 Claims, 2 Drawing Sheets

VIRTUAL BUFFER SIZE MANAGEMENT SYSTEM FOR THE TRANSMISSION OF BLOCKS OF DATA BITS IN AN HS-DSCH DOWNLINK CHANNEL OF A MOBILE COMMUNICATIONS NETWORK

The invention relates to the field of mobile communications networks, to be more precise to managing the size of the virtual buffer necessary for transmitting data bits in HS-DSCH transport channels of such networks.

As the person skilled in the art is aware, the fifth version of the 3GPP specifications governing the transmission of multimedia data in mobile (or cellular) communications networks, for example GSM/GPRS, UMTS and EDGE networks, proposes a High Speed Downlink Packet Access (HSDPA) mechanism, one particular objective of which is to provide a high bit rate for transmitting downlink packet data, for example Internet traffic, that is virtually insensitive to transmission delay. It is based on using transport channels known as high speed—downlink shared channels (HS-DSCH) that are shared between user equipments.

An HS-DSCH transport channel is situated between the MAC layer and the physical layer. Data bits coming from the HS-DSCH transport channel are transmitted to a user equipment in a set of physical channels that is situated at the level of the physical layer and that consists of at least one physical channel called an HS-PDSCH.

In the present context, the expression "user equipment" means any communications terminal able to exchange data by radio with a mobile (or cellular) communications network.

Obtaining high bit rates relies in particular on employing a transmission bit rate matching system in each base station to implement a Hybrid Automatic Repeat reQuest (HARQ) technique whereby, each time that a user equipment receives an incorrect data block from its base station on an HS-DSCH transport channel, that base station is sent a Non-Acknowledgment (NACK) message indicating incorrect reception, as a result of which a new block of data bits is sent in the HS-DSCH transport channel. On receiving this new block, the user equipment combines the data that it contains with the data contained in the block or blocks previously received incorrectly, which is temporarily stored in a dedicated buffer. To enable retransmission of the data bits from the HS-DSCH transport channel to one or more HS-PDSCH physical channels, the rate matching system includes a virtual buffer that is "installed" between two rate matching stages and is adapted to store (intermediate) data bits of a block to be transmitted to a user equipment until the base station receives from the user equipment an Acknowledgment (ACK) message indicating that it has received the block correctly.

The first stage matches the number of input bits that reach it from the HS-DSCH transport channel to the number of intermediate bits that the virtual buffer is able to contain.

The second stage matches the number of intermediate bits stored in the virtual buffer to the maximum number of output bits that can be transmitted over all the N HS-PDSCH physical channels associated with the HS-DSCH transport channel in a given transmission time interval TTI. Under the current version of the UMTS standard, the number N is in the range [1; 15].

To be more precise, each time that a block of bits must be retransmitted to an equipment, the second stage uses the intermediate bits stored in the virtual buffer to constitute a redundant version of the original block, including either the same data as the original block (this known as the Chase Combining (CC) retransmission mode) or data different from that of the original block (this is known as the Incremental Redundancy (IR) retransmission mode).

Given this mode of operation, the necessary size of the base station buffer depends largely on the size of the virtual buffer. It is therefore important for the virtual buffer to be as small as possible. However, the smaller its size, the more input bits the first rate matching stage has to eliminate (or "puncture") for it to be possible to store them in the virtual buffer. As the person skilled in the art is aware, the more input bits are eliminated, the worse the performance of the rate matching system, as a result of which retransmissions are required for an equipment to receive a block of data bits correctly.

An objective of the invention is to optimize the selection of the size of the virtual buffer that is used by a base station to match the bit rate of bits coming from the HS-DSCH transport channel that must be (re)transmitted to the user equipments over all the HS-PDSCH physical downlink channels that link them.

To this end the invention proposes a system for managing the size of the virtual buffer of a rate matching system supplying a number of intermediate bits that the virtual buffer is able to contain selected so that the first stage is able to match the number of input bits to the number of intermediate bits and the second stage is able to match the number of intermediate bits to the number of output bits that can be transmitted by all the N HS-PDSCH physical channels associated with the HS-DSCH transport channel without adding any bits.

The system preferably supplies a number of intermediate bits at least equal to a minimum value equal to the maximum number of bits that can be transmitted by all the N HS-PDSCH physical channels in a given transmission time interval (TTI).

The system even more preferably supplies a number of intermediate bits at least equal to another value greater than the minimum value. This other value may be equal to the number of input bits at the input of the first stage coming from the HS-DSCH transport channel. Thus the first stage is transparent. Under the current version of the UMTS standard, the number of input bits is equal to the sum of a chosen constant, which is preferably equal to 84, and six times the bit rate of the payload information bits (expressed in kilobits per second (kbps)) that the equipment is able to receive.

A system of the above kind may be adapted to determine for itself the number of intermediate bits that it must supply. However, it may instead supply a fixed number of intermediate bits.

The invention also proposes a system for organizing the bit rate in one or more HS-PDSCH physical channels associated with an HS-DSCH downlink transport channel and set up between a base station of a communications network and one or more user equipments, which system is provided with a management system of the type described hereinabove. Thus the system is able to adapt the size of its virtual buffer dynamically as a function of what is required.

The invention further proposes a channel coding system for a communications network comprising a system for organizing the bit rate of data bits of the type described hereinabove. The invention additionally proposes a channel coding system for a communications network comprising a management system of the type described hereinabove.

The invention is particularly well suited, although not exclusively so, to the field of 3GPP radio communications, in particular to W-CDMA, CDMA 2000, IS95, UMTS, GSM/GPRS and EDGE networks.

BRIEF DESCRIPTION OF THE DRAWINGS

Other features and advantages of the invention will become apparent on reading the following detailed description and examining the appended drawings, in which.

The appended drawings constitute part of the description of the invention and may, if necessary, contribute to the definition of the invention.

DETAILED DESCRIPTION

An objective of the invention is to enable optimization of the selected size of a virtual buffer used by a rate matching system of a transport channel coding system of a mobile communications network base station.

The invention relates to any type of mobile communications network in which HS-DSCH downlinks associated with one or more HS-PDSCH physical channels and as defined in version 5 of the 3GPP specifications can be set up between a base station and one or more user equipments. It therefore applies to 3GPP radio (or mobile) communications, in particular to W-CDMA, CDMA 2000, IS95, UMTS, GSM/GPRS and EDGE networks. A UMTS network is considered below by way of example.

The expression "user equipment" means any communications terminal capable of exchanging data by radio, in the form of signals, with either another user equipment or an equipment of its parent network, such as a base station, for example. It could be a mobile telephone, a personal digital assistant (PDA) or a portable computer equipped with a radio communications system, for example.

Figure 1:
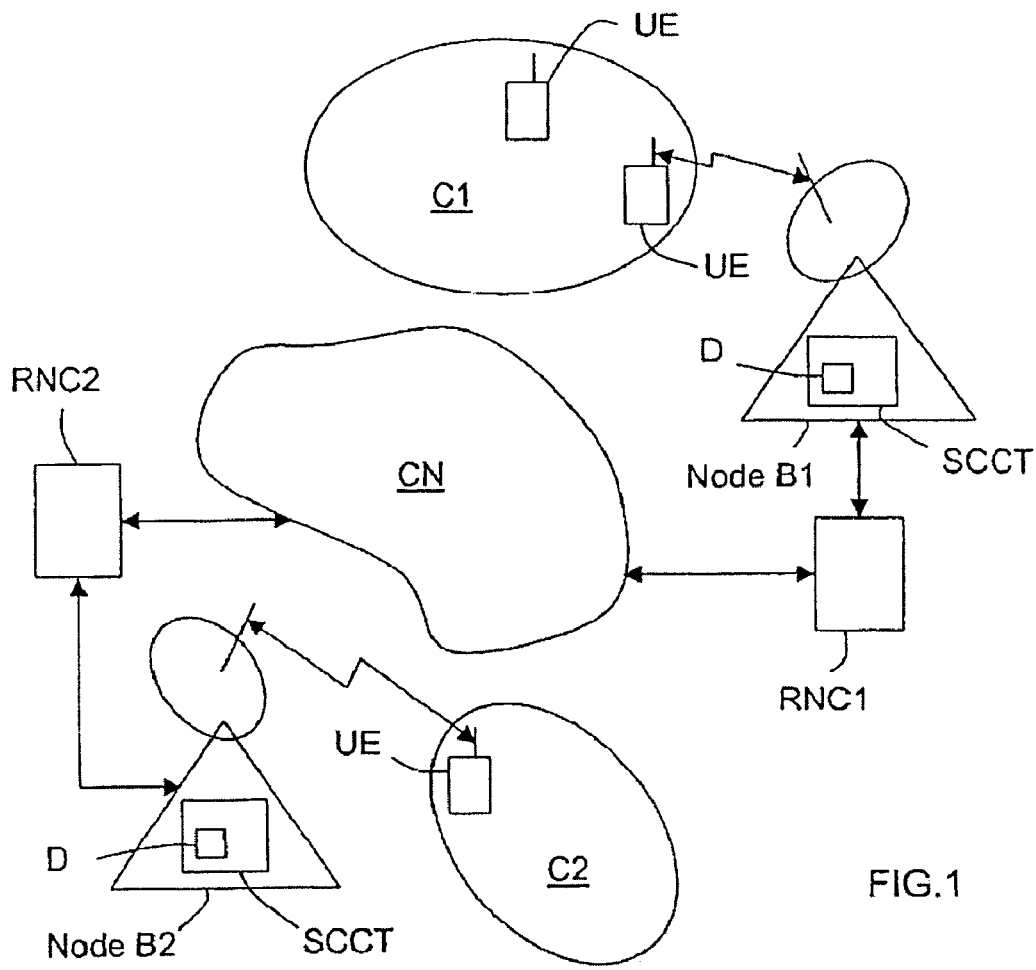
FIG. 1 is a diagram of one embodiment of a portion of a UMTS communications network comprising base stations (Node Bs) provided with a management system of the invention.

A mobile communications network in which the invention can be implemented (in this instance a UMTS network) is described first with reference to FIG. 1.

Broadly speaking, but in sufficient detail to enable the invention to be understood, a UMTS network can be regarded as a core network (CN) coupled to a radio access network including one or more base stations known as Node Bs and connected to the core network CN by one or more radio network controllers (RNC). In the example shown, the UMTS network comprises two base stations, Node B1 and Node B2, connected to the core network CN by respective nodes RNC1 and RNC2. In this example, each base station Node B1, Node B2 is associated with a single cell C1, C2 covering a radio area in which there may be one or more user equipments UE.

Each node Bi (here i=1, 2) is responsible for signal processing and in particular for managing requests for access to the UMTS network submitted by user equipments UE in the cell Ci that it controls and for managing HS-DSCH transport channels that it has set up with user equipments UE situated in its cell Ci.

Figure 2:
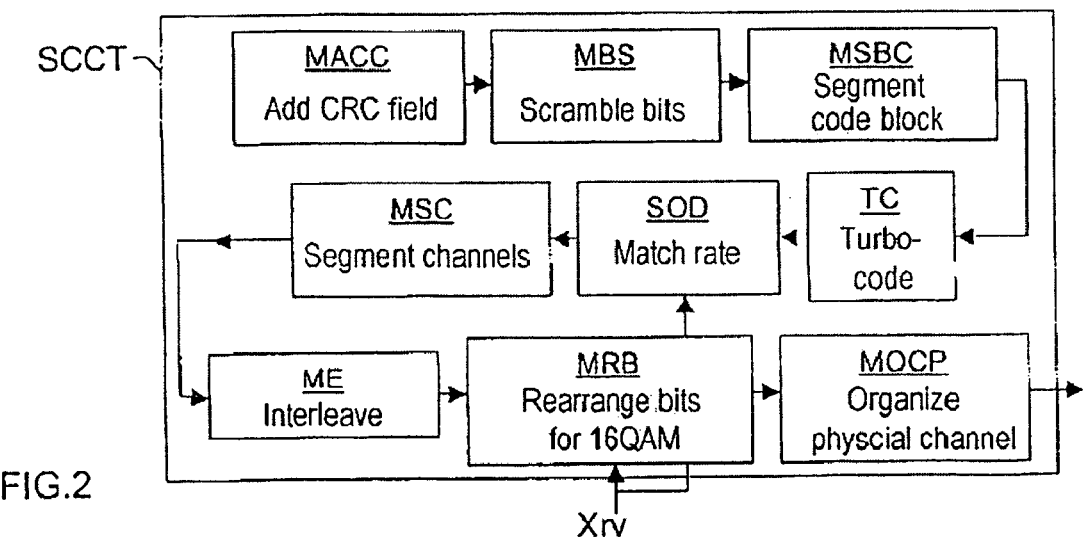
FIG. 2 is a functional diagram of one embodiment of a transport channel coding system.
Figure 3:
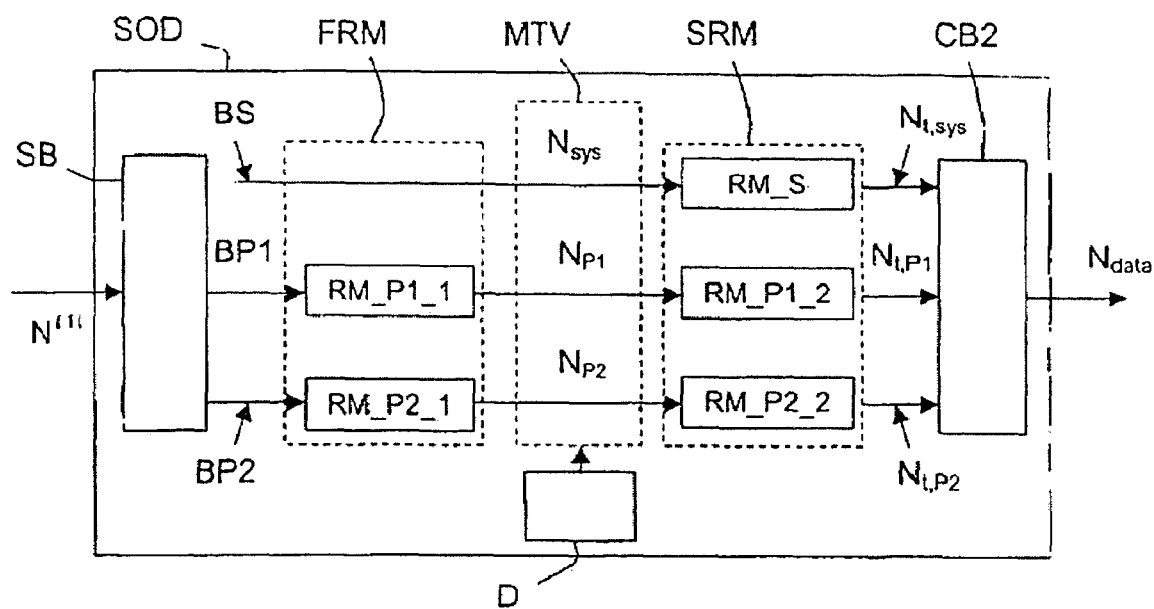
FIG. 3 is a functional diagram of one embodiment of a rate matching system equipped with a management system of the invention for use in the transport channel coding system shown in FIG. 2.

For the purposes of managing the HS-DSCH transport channels, each Node Bi comprises a transport channel coding system SCCT of the type shown by way of example in the FIG. 2 diagram. The SCCT system is not described in detail here because it is well known to the person skilled in the art and does not constitute the primary subject matter of the invention. Suffice to say that it generally comprises:

a module MACC for adding a cyclic redundancy check (CRC) field to data delivered by the concatenation module CC (the user equipment UE to which the data is addressed uses the CRC field to detect data transmission errors), a bit scrambling module MBS for placing data bits delivered by the MACC module in a pseudorandom order in order to optimize the performance of the turbocoding (TC) module, whose performance could be degraded by some particular bit sequences, a code block segmentation module MSBC for segmenting data blocks delivered by the module MBS into smaller blocks, in order to deliver blocks smaller than the maximum size supported by the channel coder, which is defined by the Technical Specification 3GPP TS 25.212, a turbocoding (or turbocoder) module TC for coding data bits delivered by the code block segmentation module MSBC in order to deliver coded bit streams $N^{TTI}$ of the "systematic", "parity 1" and "parity 2" types, referred to below as input bit streams, a rate matching system SOD for matching the respective bit rates of the various types of input bits (systematic, parity 1, parity 2) delivered by the turbocoder TC and for delivering "output" bits, as explained later with reference to FIG. 3, a physical channel segmentation module MSC responsible for segmenting (or separating) output bits delivered by the rate matching system SOD and transported by the HS-DSCH transport channel so that they can be divided between the various HS-PDSCH physical channels, an interleaving module ME for interleaving bits delivered by the physical channel segmentation module MSC to mix them to improve error correcting coding (TC) performance vis-à-vis the radio channel, where applicable, when 16QAM modulation is used, a bit rearrangement module MRB for rearranging data bits delivered by the interleaving module ME, and a physical channel rate matching module MOCP for supplying the HS-PDSCH physical channel(s) with bits delivered by the interleaving module ME or the bit rearrangement module MRB.

The maximum number of output bits that can be transmitted on the N (N>0) HS-PDSCH physical channels associated with an HS-DSCH transport channel in a given transmission time interval (TTI) varies as a function of the type of modulation. For each time transmission interval TTI, consisting of three slots of 2 ms total duration (which corresponds to one block transmitted every 2 ms), in the case of QPSK modulation, the maximum number of bits is equal to N×960, whereas in the case of 16QAM modulation this number is equal to N×1920, where N represents the number of HS-PDSCH physical channels used to transport the blocks of data bits of an HS-DSCH transport channel, and therefore the number of codes (there is one code per physical channel).

The rate matching system SOD of the invention is described in detail next with reference to FIG. 3.

The rate matching system SOD selects the data bits that a Node B must retransmit with the highest priority in one or more HS-PDSCH physical channels associated with an HS-DSCH transport channel and in the form of a block to a user equipment UE that has informed it, by means of an NACK message, in accordance with the Hybrid Automatic Repeat reQuest (HARQ) technique, that it has not received a (preceding) first block correctly.

As indicated in the introduction, the rate matching system SOD is able to operate in either a chase combining (CC) retransmission mode or an incremental redundancy (IR) retransmission mode.

In the CC mode each block to be retransmitted delivered by the rate matching system SOD includes a set of data bits identical to the set of data bits of the (first) block initially transmitted, whereas in the IR mode each block to be retransmitted delivered by the rate matching system SOD includes a set of data bits that differs at least in part from the set of data bits of the block that preceded it. Moreover, in the HARQ procedure, the retransmission of a block is triggered each time that a user equipment UE has failed to receive a first block correctly.

The IR transmission mode is advantageous since it allows the use for each new retransmission of bits other than those previously transmitted. In this transmission mode, a block is decoded in the destination user equipment UE by combining the contents of its various versions transmitted successively by the Node B to which it is temporarily attached and stored temporarily in a buffer.

As shown in FIG. 3, the rate matching system SOD includes a bit separation module SB supplied with an input bit stream $N^{TTI}$ by the turbocoder TC. The bit separation module SB separates the various types of input bits (systematic (BS) bits, parity 1 (BP1) bits and parity 2 (BP2) bits) in order for them to be processed separately by a first rate matching stage FRM.

The first rate matching stage FRM matches the number $N^{TTI}$ of input bits delivered by the turbocoder TC to the number of "intermediate" bits that an IR virtual buffer (MTV) of the invention is able to contain.

To this end, the first rate matching stage FRM includes two rate matching modules RM_P1_1 and RM_P2_1 for processing the parity 1 bits BP1 and the parity 2 bits BP2, respectively, in order to deliver to their outputs a parity 1 bit stream $N_{P1}$ and a parity 2 bit stream $N_{P2}$.

The number $N^{TTI}$ of input bits generally being greater than the number of intermediate bits that the virtual buffer MTV is able to contain, the rate matching modules RM_P1_1 and RM_P2_1 eliminate some of them; this is known as "puncturing". This bit elimination or "puncturing" technique is defined by the Technical Specification 3GPP TS 25.212, version 5.3.0.

The systematic bits are not subjected to any elimination processing in the first rate matching stage FRM and are delivered directly to a third output in the form of a systematic bitstream $N_{sys}$.

The three bitstreams $N_{sys}$, $N_{P1}$ and $N_{P2}$ feed the virtual buffer MTV. The size of the buffer MTV depends on the number of (intermediate) bits that must be stored in the Node B until the destination user equipment UE has received a first block correctly and has sent said Node B an acknowledgement message ACK in accordance with the HARQ technique.

The rate matching system SOD also includes a second rate matching stage SRM for defining the priority bit rate of each type of bitstream for each (re)transmission as a function of the value of a redundancy parameter $X_{RV}$ and for matching the number of intermediate bits stored in the virtual buffer MTV to the maximum number of "output" bits that can be transmitted by the N HS-PDSCH physical channels associated with an HS-DSCH transport channel.

To this end it comprises three rate matching modules RM_S, RM_P1_2 and RM_P2_2 for processing the systematic bitstream $N_{sys}$, the parity 1 bitstream $N_{P1}$ and the parity 2 bitstream $N_{P2}$, respectively, in order to deliver at their outputs systematic bitstreams $N_{t,sys}$, parity 1 bitstreams $N_{t,p1}$ and parity 2 bitstreams $N_{t,p2}$ that feed a bit collector CB2 delivering at an output an output bitstream $N_{data}$ grouping together the various bits streams selected and feeding the physical channel segmentation module MSC.

According to the maximum number of output bits that can be transmitted by the N HS-PDSCH physical channels associated with an HS-DSCH transport channel, the rate matching modules RM_S, RM_P1_2 and RM_P2_2 either eliminate (or puncture) intermediate bits or add bits, by a process of repetition.

Each time that the Node B receives a NACK message from a user equipment UE, the second rate matching stage SRM of its rate matching system SOD determines a set of output bits for the block to be retransmitted from the intermediate bits stored in the buffer MTV. That set is identical to the set previously (re)transmitted in the case of CC transmission or different from the set previously (re)transmitted in the case of IR transmission.

As indicated in the introduction, the larger the virtual buffer MTV, the fewer input bits the rate matching system SOD has to eliminate to match the number thereof to the capacity of said virtual buffer MTV, and thus the better the performance of the rate matching system SOD. This is because the more input bits are eliminated, the more retransmissions are required, statistically speaking, for a user equipment to be able to receive a block of data bits correctly. However, the larger the virtual buffer MTV, the larger the buffer of the Node B has to be, which represents a penalty, in particular in terms of cost.

An objective of the invention is therefore to optimize the selected size of the virtual buffer MTV in order not to penalize the Node B in which it is installed.

The invention relates to selecting the number of intermediate bits that can be stored in the virtual buffer MTV. To be more precise, the invention consists in selecting the size of the virtual buffer MTV so that, firstly, the first rate matching stage FRM is able to match the number of input bits to the number of intermediate bits by eliminating (or puncturing) bits and, secondly, the second rate matching stage SRM is able to match the number of intermediate bits to the number of output bits without adding any bits.

A minimum size of the virtual buffer MTV may be defined below which it becomes impossible to operate in the incremental redundancy (IR) mode because the performance of the rate matching system SOD becomes too degraded. In other words, the minimum size of the virtual buffer MTV is that which minimizes the size of the buffer of the Node B whilst ensuring acceptable performance.

The minimum size $S_{min}$ of the virtual buffer MTV is preferably defined by a number of bits equal to the maximum number of bits $n_{max}$ that can be transmitted by the HS-PDSCH physical channel(s). This maximum number of bits $n_{max}$ is given by the equation $n_{max}=N \times n_{max/code}$, where N is the number of HS-PDSCH physical channels (and therefore the number of codes) used to transport a transport block, and $n_{max/code}$ is the maximum number of bits that can be transmitted in an HS-PDSCH physical channel during a time interval TTI.

For example, in the case of QPSK modulation, $n_{max/code}$ is equal to 960 bits per TTI and, in the case of 16QAM modulation, $n_{max/code}$ is equal to 1920 bits per TTI.

Under the current version of the UMTS standard, the number N of HS-PDSCH codes is generally from 1 to 15 and depends on the value chosen for a quality parameter known as the channel quality indicator (CQI), which is defined by the Technical Specification 3GPP TS 25.214 and in the table below. However, it is important to note that the number of codes used by the network is not necessarily related to the quality parameter CQI.

The table below gives one example of a bit coding scheme as a function of various values of the parameter CQI and for QPSK modulation. This scheme is adapted to the UMTS standard and relates to mobile telephone classes 1 through 10. Other, more comprehensive schemes relating in particular to 16QAM modulation are defined in the Technical Specification 3GPP TS 25.214.

| CQI | Transport block size (in bits) | Maximum usable bit rate (R in kbps) | Number of HS-PDSCH codes (N) |
|---|---|---|---|
| 1 | 137 | 68.5 | 1 |
| 2 | 173 | 86.5 | 1 |
| 3 | 233 | 116.5 | 1 |
| 4 | 317 | 158.5 | 1 |
| 5 | 377 | 188.5 | 1 |
| 6 | 461 | 230.5 | 1 |
| 7 | 650 | 325 | 2 |
| 8 | 792 | 396 | 2 |
| 9 | 931 | 465.5 | 2 |
| 10 | 1262 | 631 | 3 |
| 11 | 1483 | 741.5 | 3 |
| 12 | 1742 | 871 | 3 |
| 13 | 2279 | 1139.5 | 4 |
| 14 | 2583 | 1291.5 | 4 |
| 15 | 3319 | 1659.5 | 5 |

The maximum usable bit rate R is the maximum bit rate that can be received by a user equipment UE at the level of the physical layer of the OSI system and includes in particular the headers of the protocols of the layers above the physical layer, for example the MAC and RLC layers, but does not include the fields of the physical layer, for example the CRC field.

The maximum usable bit rate R may be used to define an optimum size $S_{opt}$ of the virtual buffer MTV that is greater than the minimum $S_{min}$ and advantageous to use whenever possible.

The optimum $S_{opt}$ corresponds to the size beyond which there is no significant further improvement in the performance of the rate matching system SOD.

The optimum size $S_{opt}$ is preferably that enabling the first rate matching stage FRM not to eliminate any input bits (and therefore to be transparent), and consequently enabling the generation of the greatest number of versions of sets of data bits. It is therefore equal to $N^{TTI}$.

Under the current version of the UMTS standard, the optimum size $S_{opt}$ may be defined by an equation in which the maximum usable bit rate R (in kbps) is a variable:

$$S_{opt}=3\times((2\times R)+24+4), \text{ i.e. } S_{opt}=6R+84.$$

In this equation, firstly, the term (2×R) transforms the maximum usable bit rate R (in kbps) to a block length necessary for obtaining said bit rate, allowing for the fact that a block is sent every 2 ms, secondly, the number 24 is the length of the CRC field and, thirdly, the term ((y+4)×3), in which y is the number of bits at the input of said turbocoder TC and represents the expression ((2×R)+24), corresponds to the number of input bits delivered by the turbocoder TC. None of the other processing effected by the modules MBS, MSBC, MSC, ME, MRB and MOCP changes the number of bits to be transmitted.

For example, in the case of QPSK modulation, a number N of HS-PDSCH codes equal to 5, a value of CQI equal to 15, a number of information bits (or block size) equal to 3319 (excluding the CRC field), and a maximum usable bit rate R equal to 1659.5 kbps, the optimum size $S_{opt}$ is equal to 10041 bits and the minimum size $S_{min}$ is equal to 4800 bits.

In this example, the virtual buffer MTV must be able to contain at least 4800 bits ($S_{min}$) and preferably from 4800 to at least 10041 bits ($S_{opt}$), and if possible at least 10041 bits ($S_{opt}$).

If the number of information bits at the input of the turbocoder TC is equal to 3343 (3319+24 (CRC field)), then the number of input bits at the input of the rate matching system SOD coming from the HS-DSCH transport channel is equal to 10041. Consequently, if the size of the virtual buffer MTV is equal to 4800 bits ($S_{min}$) and the maximum number of bits $n_{max}$ that can be transmitted by the N HS-PDSCH physical channels associated with the HS-DSCH transport channel is also equal to 4800, then the first rate matching stage FRM must eliminate 5241 (10041-4800) bits to match the number of input bits to the size of the virtual buffer MTV. This elimination of 5241 bits is intended to reduce the redundancy of the error correction coding (TC). But the second rate matching stage SRM does not need to match the number of intermediate bits (stored in the virtual buffer MTV) to the number of output bits, which is equal to 4800. However, if the size of the virtual buffer MTV is equal to 10041 bits ($S_{opt}$) and the maximum number of bits $n_{max}$ that can be transmitted by the N HS-PDSCH physical channels associated with the HS-DSCH transport channel is equal to 4800, then the first rate matching stage FRM does not need to match the number of input bits to the size of the virtual buffer MTV. In this case the second rate matching stage SRM eliminates 5241 (10041-4800) intermediate bits to match their number to the number of output bits that can be transmitted by the N HS-PDSCH physical channels associated with the HS-DSCH transport channel. This elimination of bits by the second rate matching stage SRM has less impact on performance because it is not necessarily the same redundancy bits that are eliminated on each retransmission (because of the change in the value of the parameter $X_{RV}$). When bits are eliminated in the first rate matching stage FRM, the same set of data is transmitted on each retransmission, regardless of the value of the parameter $X_{RV}$, because the second rate matching stage SRM is transparent, and performance is affected.

The invention can be used in a rate matching system SOD either statically or dynamically.

In the case of static use, the size of the virtual buffer MTV is preconfigured, either by a technician at the Node B concerned, for example using a local terminal, or by instructions transmitted to the Node B by the network, for example via the radio network controller (RNC) or the OMC, or before installation (in which case it may be coded in the software or the hardware, for example).

In the case of dynamic use, the size of the virtual buffer MTV is adaptable as a function of what is required, for example with the aid of a buffer size management system D. This system D can be installed either in the Node B, for example in the rate matching system SOD of its transport channel coding system SCCT, as shown in FIGS. 1 and 3, or in a network management equipment coupled to one or more Node Bs, for example in the network management system (NMS). In this case, the system D is adapted to determine the size of the virtual buffer MTV in accordance with the invention either at its own initiative or at the request of the network.

Configuring the management system D to impose on the rate matching system SOD the use of a fixed number of intermediate bits, for example a number fixed by the network, may also be envisaged. A system D of that kind would therefore supply to the rate matching system SOD only a value that is has received itself or for which it is configured. Consequently, it could also be used statically.

The management system D of the invention may be implemented in the form of electronic circuits, software (or data processing) modules, or a combination of circuits and software. The same applies to the bit rate organization system SOD and the transport channel coding system SCCT.

The invention is not limited to the embodiments of the management system D, the rate matching system SOD and the transport channel coding system SCCT described above by way or example only, but encompasses all variants that the person skilled in the art might envisage that fall within the scope of the following claims.

The invention claimed is:

1. A buffer size management for a rate matching system which comprises:
   a first rate matching stage which matches a number of input bits coming from a transport channel comprising a high-speed downlink shared channel (HS-DSCH) associated with a set of at least one high-speed physical downlink shared channel (HS-PDSCH) on which a block of data bits are transmitted from a base station of a communications network to one or more pieces of user equipment (UE), to a selected number of intermediate bits as determined by the buffer size management system
   a virtual buffer to store the selected number of intermediate bits until reception by said base station of an acknowledgment indicating a correct reception of said block of data bits by said one or more pieces of user equipment (UE) using a hybrid automatic repeat-request (HARQ) procedure, and
   a second rate matching stage which matches the selected number of intermediate bits to a number of output bits equal to a maximum number of bits said set of the at least one high-speed physical downlink shared channel is transmitted in a given time interval, without adding bits.

2. The buffer size management system of claim 1, wherein the buffer size management system determines the number of intermediate bits to be equal to at least a minimum value ($S_{min}$) equal to the maximum number of bits guaranteed to be transmitted by said set of the at least one high-speed physical downlink shared channel in the given time interval.

3. The buffer size management system of claim 2, wherein the buffer size management system determines the number of intermediate bits to be equal to at least another value ($S_{opt}$) which is greater than said minimum value ($S_{min}$).

4. The buffer size management system of claim 3, wherein said another value ($S_{opt}$) is equal to said number of input bits at an input of said first rate matching stage coming from the transport channel.

5. The buffer size management system of claim 4, wherein said number of input bits is equal to a sum of a selected constant and six times a payload information bit rate in kilobits per second that said one or more pieces of user equipment (UE) is able to receive.

6. The buffer size management system of claim 5, wherein said constant is equal to 84.

7. The buffer size management system of claim 1, wherein the buffer size management system dynamically determines said number of intermediate bits.

8. The buffer size management system of claim 7, wherein the buffer size management system dynamically determines the number of intermediate bits to be equal to the number of input bits transmitted by the transport channel from the base station.

9. The buffer size management system of claim 8, wherein the first rate matching stage transmits the input bits received from the transport channel to the virtual buffer without modifying the number of input bits.

10. The buffer size management system of claim 8, wherein the buffer size management system dynamically optimizes the number of intermediate bits of the virtual buffer based on the number of input bits received from the transport channel and the maximum number of bits that is guaranteed to be transmitted by the set of physical channels in the given time interval.

11. A transport channel coding system for a communications network, comprising the buffer size management system of claim 1.

12. A rate matching system for matching a transmission bit rate of blocks of data bits in a set of physical channels comprising one or more high-speed physical downlink shared channels (HS-PDSCH) associated with a downlink transport channel comprising a high-speed downlink shared channel (HS-DSCH) and set up between a base station of a communications network and one or more pieces of equipment (UE), said rate matching system comprising:
   a management system which determines a selected number of intermediate bits,
   a first rate matching stage to match a number of input bits coming from said transport channel of a block of data bits to be transmitted to said piece of user equipment (UE) to the selected number of intermediate bits,
   a virtual buffer to store the selected number of intermediate bits until reception by said base station using a hybrid automatic repeat-request (HARQ) procedure of an acknowledgment indicating a correct reception of said block of data bits by said one or more pieces of user equipment (UE), and
   a second rate matching stage which matches the selected number of intermediate bits to a number of output bits equal to a maximum number of bits that is guaranteed to be transmitted by said set of physical channels in a given time interval, without adding bits.

13. A transport channel coding system for a communications network, comprising the rate matching system of claim 12.

* * * * *